United States Patent [19]

Parks

[11] Patent Number: 4,565,640

[45] Date of Patent: Jan. 21, 1986

[54] AQUEOUS COMPOSITIONS CONTAINING CYANURIC ACID

[75] Inventor: Chris F. Parks, Tulsa, Okla.

[73] Assignee: Merck & Co., Inc., Rahway, N.J.

[21] Appl. No.: 685,808

[22] Filed: Dec. 24, 1984

[51] Int. Cl.$^4$ .............................................. E21B 43/26
[52] U.S. Cl. ................................ 252/8.55 R; 166/308; 252/326
[58] Field of Search ............. 252/8.55 R, 326, 186.21, 252/187.25, 187.26, 187.27, 187.28; 166/308

[56] References Cited

U.S. PATENT DOCUMENTS

| | | | |
|---|---|---|---|
| 3,167,510 | 1/1965 | Alter | 252/8.55 |
| 3,779,914 | 12/1973 | Nimerick | 252/8.55 |
| 4,169,798 | 10/1979 | DeMartino | 252/8.55 |
| 4,218,327 | 8/1980 | Wellington | 252/8.55 |
| 4,250,044 | 2/1981 | Hinkel | 252/8.55 |
| 4,488,975 | 12/1984 | Almond | 252/8.55 |

OTHER PUBLICATIONS

New Look Water Book for Pool Professionals, (Olin pp. 9–10).

*Primary Examiner*—Herbert B. Guynn
*Attorney, Agent, or Firm*—Gabriel Lopez; Daniel T. Szura; Hesna J. Pfeiffer

[57] ABSTRACT

Aqueous compositions containing a thickener, a hypochlorite and cyanuric acid are disclosed. They are especially useful as hydraulic fracturing fluids.

3 Claims, No Drawings

AQUEOUS COMPOSITIONS CONTAINING CYANURIC ACID

BACKGROUND OF THE INVENTION

There are a number of industrial applications where it is desired to have a fluid which is highly viscous at one time and of relatively low viscosity at a later time; for example, where it is desired that the fluid suspend particulate matter while it is in transit and then deposit the particulates or allow them to settle at a given place or time. The present invention is concerned with such fluids.

One especially important application of such fluids is in the practice of fracturing subterranean formations. A (hydraulic) fracturing fluid having granular insoluble particulate material suspended or slurried therein is injected down a well penetrating the formation and forced back into the formation. This causes the formation to crack or fracture thereby improving the flow of oil, gas, water, etc., between the formation and the well. Fracturing is customarily conducted by employing oil, water, (usually thickened) or an emulsion thereof which has suspended therein particles (proppants) which are substantially insoluble in the liquid and the fluids of the formation. The particles are thereby forced into the fractures created, thus propping open the fractures when the fracturing pressures are subsequently released.

To maintain a proppant suspended in the fluid until it is lodged in a fracture presents problems since the propping agent tends to settle out. This sometimes occurs prematurely resulting in what is known as a sand-out or a screen-out. In efforts to avoid this premature deposition of proppants, the suspending ability of fracturing fluids are improved by thickening them with a suspending agent (a viscosity increasing agent). Although this aids in maintaining the propping agent in suspension until it is lodged in the fraction, it tends to prevent the removal of the fracturing liquid from the fractures.

The use of additives, also called "breakers", to reduce the viscosity of various polymeric thickening agents is known. In U.S. Pat. No. 2,483,936 the viscosity of an aqueous solution of guar gum is reduced by dispersing in the solution sodium and hydrogen peroxide. In U.S. Pat. No. 3,024,191 the viscosity of a carboxymethylcellulose is reduced with a perborate. In U.S. Pat. No. 3,167,510 the viscosity of aqueous solutions thickened with guar gum are decreased by employing a persulfate. In U.S. Pat. No. 3,442,803 a polymer a acrylamide and methylenebisacrylamide is broken by adding a water soluble persulfate or perborate thereto.

It has now been discovered that the viscosity of an aqueous solution containing a polymeric thickener, e.g. xanthan gum, can be controllably broken by the addition thereto of an alkali metal hypochlorite and cyanuric acid.

SUMMARY OF THE INVENTION

Aqueous composition containing a thickener, alkali metal or alkaline earth metal hypochlorite and cyanuric acid.

DETAILED DESCRIPTION OF THE INVENTION

An embodiment of the present invention is an aqueous, controlled viscosity composition containing 1) a thickener, 2) an alkali metal (Na, K, Li) or alkaline earth metal (Ba, Ca, Sr, Mg) hypochlorite and 3) cyanuric acid wherein the concentration by weight of 1) is about 0.1% to about 1.0%; of 2) is about 0.025% to about 1.5% and of 3) is about 0.005% to about 0.5%.

The use of xanthan gum is viscosified (thickened) fluids for various drilling operations is well-known. such operations where a reduction in viscosity over time is desired include hydraulic fracturing, gravel packing, and numerous other workover and completion operations, such as the use of "kill fluids" which exert sufficient hydraulic weight to overbalance formation processes.

There are two basic limitations in developing an acceptable breaker for such viscosified fluids. The first is that a degraded fluid is generally defined by the oil and gas producing industry as one hving a viscosity of less than 10 cP at a shear rate of 170 sec.$^{-1}$. The second is that the break should occur between 2 and 24 hours after preparation of the fluid. Preferably between 3–8 hours, but 9–24 hours is acceptable. This allows sufficient working time to pump the fluid into position and yet minimizes delays in waiting for the break to occur.

The formulations of this invention break within these time limits and the viscosity of the fluid is reduced to at least 10 cP at 170 sec$^{-1}$.

All the ingredients of the formulations of this invention are commerically available. Xanthan gum is available as XANCO-FRAC ® (Kelco Div., Merck & Co., Inc.). Cyanuric acid is sold as Pool Doctor (World Industries Int., Inc., Azrisa, Calif.). A lithium hypochlorite is produced by the Lithium Corp. of America, Gastonia, N.C. Other alkali and alkaline earth metal hypochlorites are also known and many are commercially available.

A typical hydraulic fracturing fluid of this invention comprises;

| | |
|---|---|
| Fresh water | 20 kgal. |
| KCl | 3.3–5 klb. |
| Cyanuric acid | 33–100 lb. |
| Xanthan gum | 600 lb. |
| NaHCO$_3$ | 33–133 lb. |
| LiOCl | 450 lb. |
| Graded sand | 20–100 klb. |

The use of a salt (eg, KCl is for control of clay swelling and is clearly optional, as when there is a high salt content in the available water. The use of a buffer is also optional. The preparation and use of fracturing fluids is well known in the drilling industry. In preparing the fluids of this invention, conventional procedures are used. It is preferred that the hypochlorite should be a stable solid and be added after the cyanuric acid.

The invention is further defined and illustrated by the following examples, which are intended to be illustrative and not limiting.

EXAMPLE 1

125° F. (52° C.) DEGRADATION

Viscous solutions of xanthan gum (30 lb. XANCO-FRAC/1000 gal. water) having an initial viscosity of 39 cP at 170 sec$^{-1}$, at ambient temperatures (eg. R.T.) containing 2% KCl were prepared in tap water, and heated in a 52° C. water bath. To these were added various amounts of lithium hypochlorite and cyanuric acid and viscosities measured over time in a Fann type viscometer Model 35A, equipped with a 1.0 spring, at 100 rpm, equivalent to a shear rate of 170 sec$^{-1}$.

The data of Table 1-1 shows the time to degrade the various formulations, prepared according to Example 1, to less than 10 cP.

TABLE 1-1
DEGRADATION AT 52° C.

| Fluid Composition (lbs./1000 gal.) | | Degradation Time (Hours) | | | |
|---|---|---|---|---|---|
| Test No. | LiOCl | Cyanuric Acid | 0–2 | 3–8 | 9–24 | Over 24 |
| 1 | 0 | 0 | | | | X |
| 2 | 22.5 | 0 | X | | | |
| 3 | 22.5 | 0 | X | | | |
| 4 | 22.5 | 0 | X | | | |
| 5 | 18.7 | 0 | X γ | | | |
| 6 | 18.7 | 1.6 | | | X | |
| 7 | 18.7 | 2.5 | | | | X |
| 8 | 18.7 | 3.3 | | | | X |
| 9 | 15.0 | 0 | X γ | | | |
| 10 | 15.0 | 0.9 | | | X | |
| 11 | 15.0 | 1.7 | | | | X |
| 12 | 15.0 | 2.5 | | | | X |
| 13 | 15.0 | 3.3 | | | | X |

γ = average of three tests

EXAMPLE 2

150° F. (65.6° C.) DEGRADATION

Following the procedure of Example 1, but at a temperature of 65.6° C., the data of table 2-1 were obtained.

TABLE 2-1
DEGRADATION AT 65.6° C.

| Fluid Composition (lbs./1000 gal.) | | Degradation Time (Hours) | | | |
|---|---|---|---|---|---|
| Test No. | LiOCl | Cyanuric Acid | 0–2 | 3–8 | 9–24 | Over 24 |
| 14 | 0 | 0 | | | | X |
| 15 | 22.5 | 0 | X | | | |
| 16 | 22.5 | 3.3 | | X | | |
| 17 | 18.6 | 0 | X | | | |
| 18 | 18.6 | 1.7 | X | | | |
| 19 | 18.6 | 2.5 | X | | | |
| 20 | 18.6 | 3.3 | | X | | |
| 21 | 15.0 | 0 | X | | | |
| 22 | 15.0 | 1.7 | | X | | |
| 23 | 15.0 | 1.7 | | | X | |
| 24 | 15.0 | 1.7 | | | X | |
| 25 | 15.0 | 2.5 | | X | | |
| 26 | 15.0 | 2.5 | | | X | |
| 27 | 15.0 | 3.3 | | | | X |

The data in the tables show that cyanuric acid effectively modulates the breaking of the xanthan gum thickened fluids (see Test Nos. 5–8, 9–13, 15–16, 19–20, and 21–27). The ratio of the ingredients, i.e. xanthan gum/hypochlorite/cyanuric acid, may be varied to effect the desired optimum viscosity degradation time and is dependent to some extent on the system in which the fluid will be used, the temperatures encountered, etc.

Other hypochlorites eg. $Ca(OCl)_2$, $Mg(OCl)_2$ and the like may be used in place of LiOCl in equimolar amounts based on the hypochlorite $(OCl)^-$ moiety comparable effectiveness. Stable solid hypochlorites are preferred.

Claims to the invention follow.

What is claimed is:

1. An aqueous controlled viscosity composition containing: (1) about 0.1% to about 1.0% xanthan gum, (2) about 0.025% to about 1.5% alkali metal or alkaline earth metal hypochlorite, and (3) about 0.005% to about 0.5% cyanuric acid.

2. A composition of claim 1 wherein the hypochlorite is LiOCl.

3. An aqueous hydraulic fracturing compsition wherein viscosity degradation rate is controlled containing about 0.1% to about 1.0% xanthan gum, about 0.025% to about 1.5% alkali metal or alkaline earth metal hypochlorite, and about 0.005% to about 0.5% cyanuric acid.

* * * * *